(12) United States Patent
Izumikawa (10) Patent No.: US 11,414,838 B2
(45) Date of Patent: Aug. 16, 2022

(54) SHOVEL

(71) Applicant: SUMITOMO(S.H.I.) CONSTRUCTION MACHINERY CO., LTD., Tokyo (JP)

(72) Inventor: Takeya Izumikawa, Chiba (JP)

(73) Assignee: SUMITOMO (S.H.I.) CONSTRUCTION MACHINERY CO., LTD., Tokyo (JP)

(*) Notice: Subject to any disclaimer, the term of this patent is extended or adjusted under 35 U.S.C. 154(b) by 717 days.

(21) Appl. No.: 16/198,031

(22) Filed: Nov. 21, 2018

(65) Prior Publication Data

US 2019/0093318 A1 Mar. 28, 2019

Related U.S. Application Data

(63) Continuation of application No. PCT/JP2017/023873, filed on Jun. 29, 2017.

(30) Foreign Application Priority Data

Jul. 4, 2016 (JP) .............................. JP2016-132678

(51) Int. Cl.
*E02F 9/26* (2006.01)
*G08B 6/00* (2006.01)
(Continued)

(52) U.S. Cl.
CPC ................ *E02F 9/261* (2013.01); *B60R 1/00* (2013.01); *E02F 3/435* (2013.01); *E02F 9/2004* (2013.01);
(Continued)

(58) Field of Classification Search
CPC ... E02F 3/425; E02F 3/96; E02F 3/964; E02F 3/32; E02F 3/325; E02F 9/2207;
(Continued)

(56) References Cited

U.S. PATENT DOCUMENTS

| 9,972,205 B2 * | 5/2018 | Beaulieu | ............... H04W 4/023 |
| 2011/0153169 A1 * | 6/2011 | Peterson | ............. A01M 7/0089 |
| | | | 701/50 |

(Continued)

FOREIGN PATENT DOCUMENTS

| JP | H3-221628 | 9/1991 |
| JP | H03-228929 | 10/1991 |

(Continued)

OTHER PUBLICATIONS

JP 2002227252 English translation (ip.com) (Year: 2022).*
International Search Report for PCT/JP2017/023873 dated Aug. 29, 2017.

*Primary Examiner* — Jelani A Smith
*Assistant Examiner* — Paul A Castro
(74) *Attorney, Agent, or Firm* — Ipusa, PLLC (57) ABSTRACT

A shovel includes a traveling body, a turning body turnably mounted on the traveling body, an object detecting part configured to detect a predetermined object around the shovel, a controller configured to restrict a motion of the shovel or report detection of an object when the object is detected, and a canceling part configured to execute a cancellation of restricting the motion or reporting the detection. A person around the shovel is alerted at the time of the cancellation.

9 Claims, 8 Drawing Sheets

(51) Int. Cl.
- *G08B 5/36* (2006.01)
- *E02F 9/24* (2006.01)
- *B60R 1/00* (2022.01)
- *E02F 3/43* (2006.01)
- *E02F 9/20* (2006.01)
- *G08B 21/02* (2006.01)
- *E02F 3/32* (2006.01)

(52) U.S. Cl.
CPC .............. *E02F 9/2033* (2013.01); *E02F 9/24* (2013.01); *E02F 9/262* (2013.01); *G08B 5/36* (2013.01); *G08B 6/00* (2013.01); *G08B 21/02* (2013.01); *B60R 2300/8033* (2013.01); *E02F 3/32* (2013.01)

(58) Field of Classification Search
CPC ......... E02F 9/2271; E02F 9/2275; E02F 3/34; E02F 3/3636; E02F 3/3663; E02F 3/384; E02F 3/4131; E02F 3/4135; E02F 3/92; E02F 3/963; E02F 3/966; E02F 7/065; E02F 9/006; E02F 9/2203; E02F 9/2285; E02F 3/422; E02F 9/0841; E02F 9/085; E02F 9/2235; E02F 9/2242; E02F 9/2296; E02F 9/28; E02F 9/261; E02F 3/435; E02F 9/2004; E02F 9/2033; E02F 9/24; E02F 9/262; E02F 9/26; A01B 33/06; A01B 33/087; A01B 33/10; A01B 39/085; A01B 39/166; A01B 63/12; A01B 69/008; A01B 3/02; A01B 35/02; A01B 71/00; A01B 76/00; A01B 15/06; A01B 49/022; A01B 49/06; A01B 49/065; A01B 69/00; B66C 3/02; B66C 3/16; F15B 2211/329; F15B 2211/36; F15B 2211/6054; F15B 2211/6316; F15B 2211/6346; F15B 2211/7053; B60R 1/00; B60R 2300/8033; G08B 5/36; G08B 6/00; G08B 21/02

See application file for complete search history.

(56) References Cited

U.S. PATENT DOCUMENTS

| | | | |
|---|---|---|---|
| 2014/0212846 A1* | 7/2014 | Miller | E02F 9/24 434/29 |
| 2015/0183370 A1 | 7/2015 | Nakanishi et al. | |
| 2016/0304028 A1* | 10/2016 | Hathaway | G08G 1/04 |

FOREIGN PATENT DOCUMENTS

| | | | |
|---|---|---|---|
| JP | 2981943 | | 11/1999 |
| JP | 2000-352078 | | 12/2000 |
| JP | 2002-105991 | | 4/2002 |
| JP | 2002227252 A | * | 8/2002 |
| JP | 2002-348919 | | 12/2002 |
| JP | 2004-076257 | | 3/2004 |
| JP | 2009-121053 | | 6/2009 |
| JP | 2014-181508 | | 9/2014 |
| JP | 2014-181510 | | 9/2014 |
| JP | 2015-168972 | | 9/2015 |
| JP | 6052881 B2 | * | 12/2016 |
| WO | 2005/054649 | | 6/2005 |

* cited by examiner

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2017/023873, filed on Jun. 29, 2017 and designating the U.S., which claims priority to Japanese patent application No. 2016-132678, filed on Jul. 4, 2016. The entire contents of the foregoing applications are incorporated herein by reference.

BACKGROUND

Technical Field

The present invention relates to shovels capable of detecting an object in the surroundings.

Description of Related Art

A shovel that detects a person around a shovel based on the output of a pyroelectric infrared sensor is known.

This shovel outputs an alarm to an operator of the shovel inside a cabin to stop the motion of the shovel in response to detecting a person around the shovel. After checking the surrounding situation, the operator of the shovel cancels the alarm by depressing an alarm stop button displayed on a liquid crystal display to restart the motion of the shovel.

SUMMARY

According to an aspect of the present invention, a shovel includes a traveling body, a turning body turnably mounted on the traveling body, an object detecting part configured to detect a predetermined object around the shovel, a controller configured to restrict a motion of the shovel or report detection of an object when the object is detected, and a canceling part configured to execute a cancellation of restricting the motion or reporting the detection. A person around the shovel is alerted at the time of the cancellation.

DETAILED DESCRIPTION

The operator of a shovel, after stopping the alarm ringing in the cabin, may restart the motion of the shovel without notifying workers around that the shovel starts to move. As a result, it may be possible that the workers around who are not prepared for the restart of the motion of the shovel are not sufficiently alerted.

Therefore, it is desired to provide a shovel that can reliably alert workers around when restrictions such as an alarm to an operator of the shovel are removed.

According to an aspect of the present invention, it is possible to provide a shovel that can reliably alert workers around when restrictions such as an alarm to an operator of the shovel are removed.

Figure 1A:
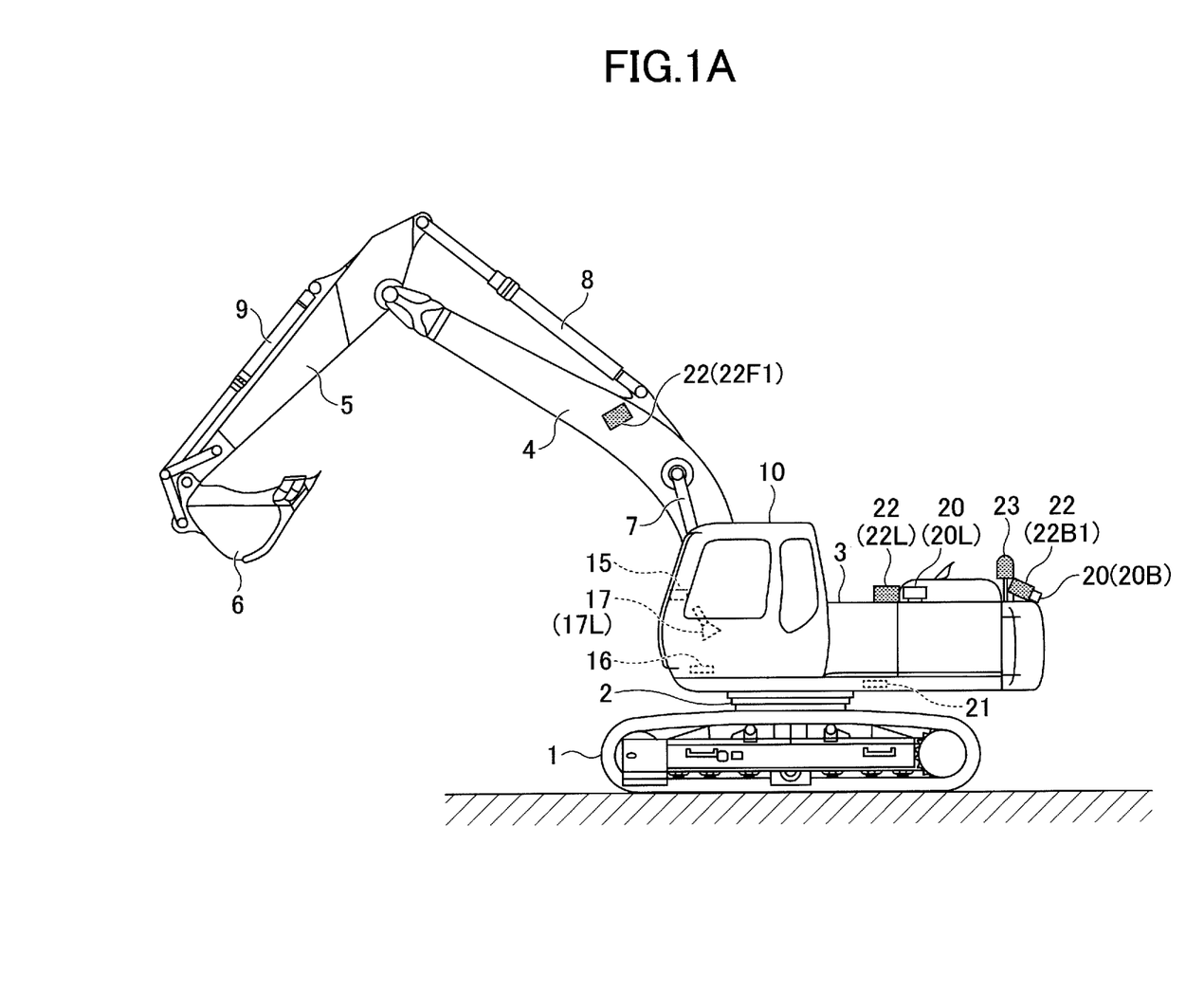
FIG. 1A is a side view of a shovel according to an embodiment of the present invention.
Figure 1B:
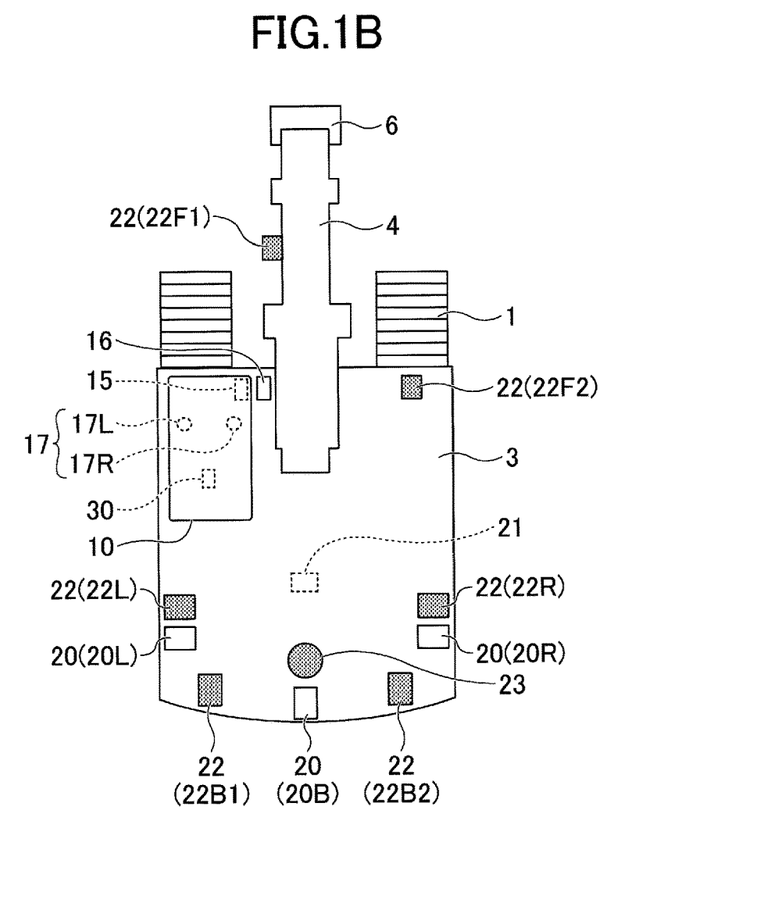
FIG. 1B is a plan view of the shovel of FIG. 1A.
Figure 1C:
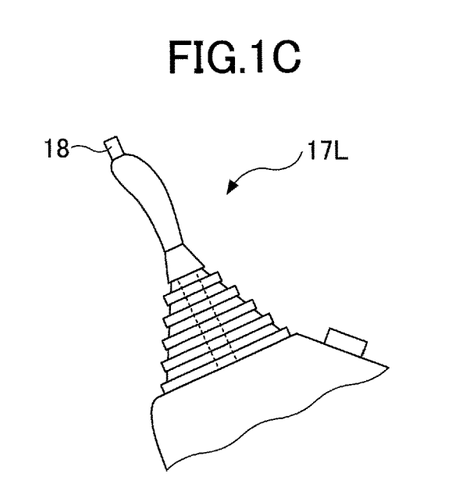
FIG. 1C is an enlarged side view of a left operating lever in FIG. 1B.

First, a shovel (an excavator) according to an embodiment of the present invention is described with reference to FIGS. 1A through 1O. FIG. 1A is a side view of the shovel, and FIG. 1B is a plan view of the shovel. FIG. 1O is an enlarged side view of a left operating lever 17L in FIG. 1B.

As illustrated in FIGS. 1A and 1B, an upper turning body 3 is turnably mounted on a lower traveling body 1 of the shovel via a turning mechanism 2. A boom 4 is attached to the upper turning body 3. An arm 5 is attached to the end of the boom 4, and a bucket 6 is attached to the end of the arm 5. The boom 4, the arm 5, and the bucket 6 are hydraulically driven by a boom cylinder 7, an arm cylinder 8, and a bucket cylinder 9, respectively. A cabin 10 serving as a cab is provided and power sources such as an engine are mounted on the upper turning body 3.

Furthermore, a horn 16, an object detecting unit 20, a traveling alarm 21, a work light 22, and a rotating light 23 are attached to the upper turning body 3.

The horn 16 is an example of a surroundings alarm that outputs a sound to the surroundings of the shovel. According to this embodiment, the horn 16 is an electronic horn that is attached to the upper surface of the upper turning body 3 between the boom 4 and the cabin 10 to output a sound mainly to a person in front of the shovel. The horn 16, however, may be other types of horns such as an air horn. The horn 16 outputs a sound when a horn switch 18 is depressed, for example. According to this embodiment, the horn 16 continuously outputs a sound while the horn switch 18 is being depressed. The horn 16 may alternatively be configured to continuously output a sound for a predetermined time after the horn switch 18 is depressed. The horn 16 is used to, for example, signal a driver of a dump truck or notify a person around the shovel of the presence of the shovel.

The object detecting unit 20 is a unit for detecting an object around the shovel. The object detecting unit 20 is, for example, an image sensor for obtaining an image of the surroundings of the shovel. The image sensor is composed of, for example, an imaging device such as a CCD or CMOS. According to this embodiment, the image sensor is composed of three monocular cameras attached to the upper surface of the upper turning body 3 so that the blind spots of an operator in the cabin 10 can be imaged. The three monocular cameras are a left camera 20L attached to the left end of the upper surface of the upper turning body 3, a right camera 20R attached to the right end of the upper surface of the upper turning body 3, and a back camera 20B attached to the back end of the upper surface of the upper turning body 3. The three monocular cameras are desirably attached to the upper turning body 3 in such a manner as not to project from the upper surface of the upper turning body 3 as illustrated in FIG. 1B. The left camera 20L may be omitted.

The object detecting unit 20 may alternatively be an ultrasonic sensor, a laser radar sensor, a millimeter wave sensor, a pyroelectric infrared sensor, a bolometer infrared sensor, an infrared camera or the like.

The traveling alarm 21 is an audio output device that outputs audio in conjunction with the traveling of the shovel. The traveling alarm 21 outputs a sound to the surroundings of the shovel when the shovel travels, for example. According to this embodiment, the traveling alarm 21 is a loudspeaker that is attached to the lower surface of the upper turning body 3 on the opposite side of a turning axis from the horn 16 to output a sound mainly to persons who are to the side and at the back of the shovel. The traveling alarm 21 outputs a sound in response to a traveling lever or traveling pedal being operated. According to this embodiment, the traveling alarm 21 continuously outputs a sound while a traveling lever or traveling pedal is being operated. Alternatively, the traveling alarm 21 may continuously output a sound while a traveling hydraulic motor is rotating.

The work light 22 is a lighting apparatus that illuminates the surroundings of the shovel. According to this embodiment, the work light 22 includes a first front work light 22F1 attached to a side of the boom 4, a second front work light 22F2 attached to the front right end of the upper turning body 3, a left work light 22L attached to the left end of the upper turning body 3, a right work light 22R attached to the right end of the upper turning body 3, and a first back work light 22B1 and a second back work light 22B2 attached to the back end of the upper turning body 3. The work light 22 may alternatively be attached to other positions such as the front end of the upper surface of the cabin 10. The work light 22 is desirably attached to the upper turning body 3 in such a manner as not to project from the upper surface of the upper turning body 3 as illustrated in FIG. 1B. The turning on and off of the work light 22 is switched using, for example, a work light switch installed in the cabin 10. Work lights may be individually or collectively subjected to the switching of the turning on and off. Furthermore, the turning on and off of the work light 22 may be automatically switched in response to a command from a controller 30.

The rotating light 23 is a lighting apparatus that alerts a person around the shovel using light. According to this embodiment, the rotating light 23 is attached to a rear portion of the upper surface of the upper turning body 3 to alert mainly persons to the side and at the back of the shovel. The turning on and off of the rotating light 23 is switched using, for example, a rotating light switch installed in the cabin 10. Alternatively, the turning on and off of the rotating light 23 may be automatically switched in response to a command from the controller 30.

An interior alarm 15, an operating lever 17, the controller 30, etc., are installed in the cabin 10.

The interior alarm 15 is a device that alerts the operator in the cabin 10, and outputs an alarm to the operator in the cabin 10, for example. The interior alarm 15 may be a buzzer, a loudspeaker, a display, an LED lamp, a sheet vibrator or the like. The alarm includes at least one of, for example, a visual alarm, an aural alarm, and a tactile alarm. According to this embodiment, the interior alarm 15 includes a display.

The operating lever 17 is a device used to operate the shovel. According to this embodiment, the operating lever 17 is composed of the left operating lever 17L and a right operating lever 17R. Typically, the left operating lever 17L is used to open and close the arm 5 and turn the upper turning body 3 leftward and rightward, and the right operating lever 17R is used to raise and lower the boom 4 and open and close the bucket 6.

The horn switch 18 is provided at the end of the left operating lever 17L as illustrated in FIG. 10. The operator of the shovel can depress the horn switch 18 with the thumb of the left hand while operating the left operating lever 17L forward, backward, leftward and rightward with the left hand, for example. The horn switch 18 may alternatively be provided at another position on the left operating lever 17L or provided on the right operating lever 17R.

The horn switch 18 is a switch for activating the horn 16. According to this embodiment, the horn 16 is directly connected to the horn switch 18, and is configured to continuously operate while the horn switch 18 is being depressed. The horn 16, however, may additionally or alternatively be connected indirectly to the horn switch 18 by way of the controller 30. In this case, the horn 16 can operate in response to a control command from the controller 30.

The horn switch 18 is connected to the controller 30. This connection may be either a wired connection or a wireless connection, and may be either an analog connection or a digital connection. The controller 30 outputs a control command to the interior alarm 15 in response to a control command from the horn switch 18 to cancel alarming by the interior alarm 15, for example.

The horn switch 18 may alternatively be a hardware button installed in another place in the cabin 10 or a software button displayed on a touchscreen display.

The controller 30 is a computer that includes a CPU, a volatile storage device, and a nonvolatile storage device. According to this embodiment, the controller 30 generates an output image based on camera images captured by the back camera 20B, the left camera 20L, and the right cameral 20R, for example, and causes the generated output image to be displayed on an in-vehicle display. The output image is, for example, an overhead view image generated by performing viewing transformation on a composite image of the three camera images. The output image may alternatively be a through-the-lens image of each camera.

Figure 2A:
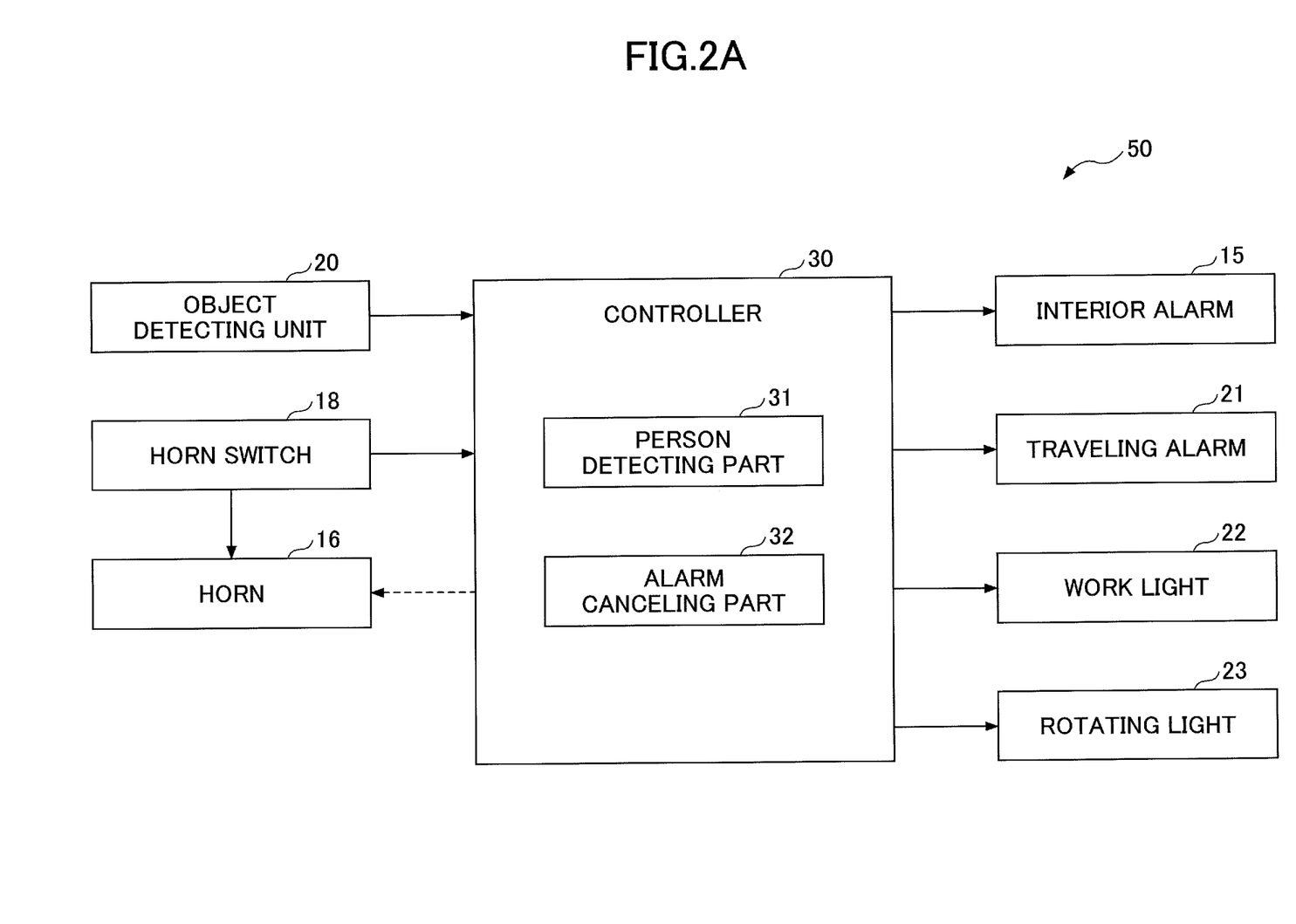
FIG. 2A is a block diagram illustrating a configuration of a person detecting system.
Figure 2B:
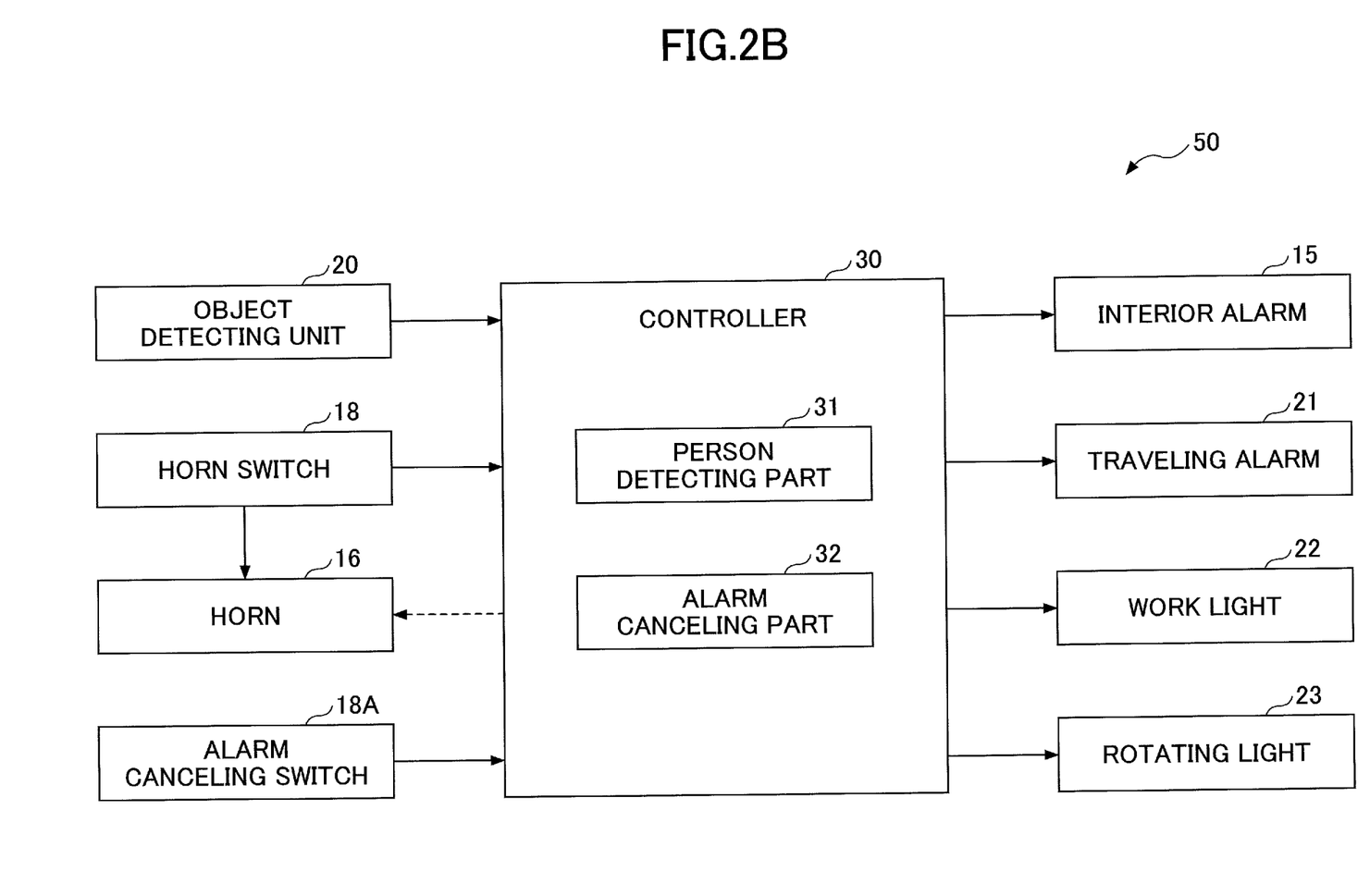
FIG. 2B is a block diagram illustrating another configuration of the person detecting system.

Here, an object detecting system 50 installed in the shovel of FIG. 1A is described with reference to FIGS. 2A and 2B. FIG. 2A is a block diagram illustrating a configuration of the object detecting system 50. FIG. 2B is a block diagram illustrating another configuration of the object detecting system 50.

The object detecting system 50 is a system that detects an object around the shovel, and is composed mainly of the interior alarm 15, the horn 16, the horn switch 18, the object detecting unit 20, the traveling alarm 21, the work light 22, the rotating light 23, and the controller 30. The object is a person, a vehicle, a work machine, an animal or the like. According to this embodiment, the object detecting system 50 detects a person.

According to the object detecting system 50 of FIGS. 2A and 2B, the controller 30 causes the CPU to execute programs corresponding one to each of functional elements such as a person detecting part 31 and an alarm canceling part 32 to implement functions corresponding to the functional elements.

The person detecting part 31 is a functional element to detect a person around the shovel. The person detecting part 31 is an example of an object detecting part that detects a predetermined object. According to this embodiment, the person detecting part 31 determines the presence or absence of a person around the shovel based on the output of the image sensor serving as a person detecting part and the object detecting unit 20. In this case, the person detecting part 31 detects a person based on an image shape, and therefore, can distinguish between objects other than persons, such as trees and buildings, and persons. The person detecting part 31 determines the presence or absence of a person around the shovel by identifying a person image in a captured image, using image features such as HOG features, for example. The person detecting part 31 may alternatively determine the presence or absence of a person around the shovel using other known image recognition techniques.

Furthermore, the person detecting part 31 may also determine the presence or absence of a person around the shovel based on the output of an object detecting sensor such as an ultrasonic sensor, a laser radar sensor, a millimeter wave sensor, a pyroelectric infrared sensor, a bolometer infrared sensor, an infrared camera or the like serving as a person detecting part and the object detecting unit 20. For example, in the case of using the output of a pyroelectric infrared sensor, when an energy change in a predetermined detection space exceeds a predetermined threshold, the person detecting part 31 determines entry of an object into the detection space, namely, the presence of a person.

In response to detecting a person around the shovel, the person detecting part 31 outputs a control command to the interior alarm 15 to activate the interior alarm 15 to inform the operator of the shovel of the detection of a person around the shovel. According to this embodiment, the person detecting part 31 activates a buzzer installed in the cabin 10 to report the detection of a person around the shovel to the operator of the shovel. The person detecting part 31 may cause an image indicating the detection of a person around the shovel to be displayed on a display installed in the cabin 10. The person detecting part 31 may cause a camera image including an image of a detected person to be displayed on the display as an output image. The person detecting part 31 may light up an LED lamp to indicate the detection of a person around the shovel, and may vibrate an operator seat or the operating lever 17 using a vibrator. The person detecting part 31 may stop the motion of the shovel by forcibly stopping the engine or may restrict the motion of the shovel by nullifying an operation input via the operating lever 17. The person detecting part 31 may wirelessly transmit a command to a portable device such as a cellular phone, a smartphone, or a buzzer possessed by the operator of the shovel to cause the portable device to output at least one of sound, display, light, and vibration.

The alarm canceling part 32 is a functional element to cancel an alarm. According to this embodiment, when a predetermined operation is performed, the alarm canceling part 32 cancels an alarm made active by the person detecting part 31. For example, the alarm canceling part 32 deactivates the interior alarm 15 in response to determining that the horn switch 18 is depressed based on a signal from the horn switch 18. The horn switch 18 directly activates the horn 16 when depressed. That is, the horn switch 18 can activate the horn 16 independent of the controller 30. When the horn 16 is connected to the controller 30 as indicated by the dashed arrow in FIG. 2A, however, the controller 30 may activate the horn 16 when the horn switch 18 is depressed. In this case, the horn 16 does not have to be connected to the horn switch 18.

This configuration makes it possible for the shovel or the alarm canceling part 32 according to this embodiment to activate the horn 16 at the same time with canceling alarming by the interior alarm 15. That is, the operator of the shovel can reliably sound a horn when canceling an alarm. Therefore, when an alarm to the operation of the shovel is canceled, it is possible to reliably alert workers around, and to reliably notify workers around that the shovel starts to move.

The alarm canceling part 32 may activate a surroundings alarm other than the horn 16 when canceling an alarm to the operator of the shovel in order to more reliably alert workers around when the alarm to the operator of the shovel is canceled.

The surroundings alarm is a device that outputs an alarm to a person around the shovel, and includes, for example, the traveling alarm 21, the work light 22, and the rotating light 23 attached to the upper turning body 3, in addition to the horn 16.

For example, in response to determining the depression of the horn switch 18 based on a signal from the horn switch 18, the alarm canceling part 32 deactivates the interior alarm 15 and activates the traveling alarm 21, the work light 22, and the rotating light 23. At least one of the traveling alarm 21, the work light 22, and the rotating light 23 may be activated. Furthermore, when the horn 16 is connected only to the controller 30, that is, when the alarm canceling part 32 can control whether to activate the horn 16, the activation of the horn 16 may be omitted. Furthermore, the work light 22 may be flashed.

The alarm canceling part 32 may activate the surroundings alarm for a predetermined time when canceling alarming by the interior alarm 15. For example, the alarm canceling part 32 may have the traveling alarm 21, the work light 22, and the rotating light 23 activated continuously for a predetermined time after deactivating the interior alarm 15.

Figure 2C:
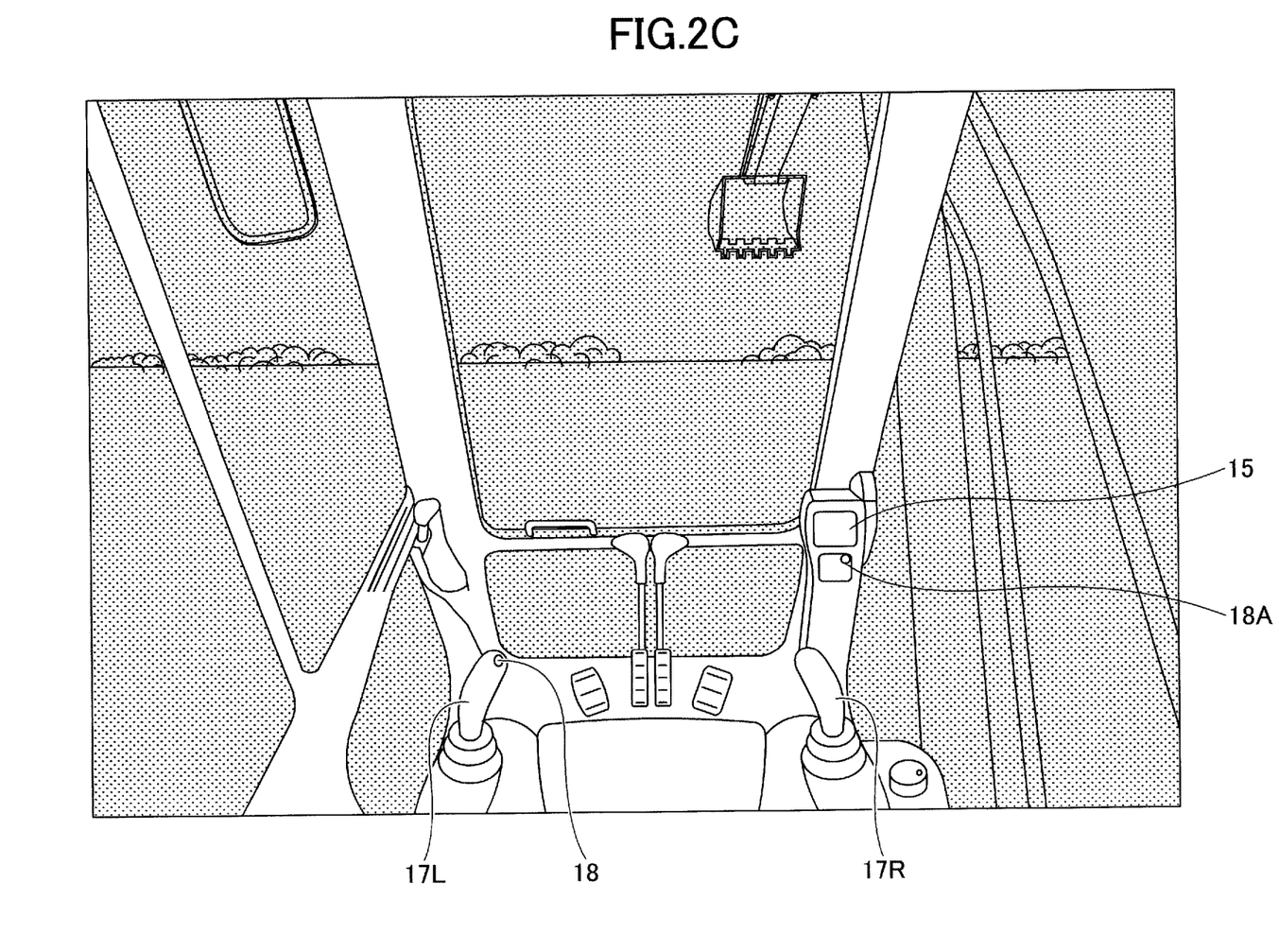
FIG. 2C is a diagram illustrating how a cabin looks inside.

The alarm canceling part 32 may deactivate the interior alarm 15 in response to determining that an alarm canceling switch 18A has been operated. FIG. 2B is a block diagram illustrating a configuration of the object detecting system 50 including the alarm canceling switch 18A. FIG. 2C is a diagram illustrating how the cabin 10 looks inside when the operator is seated on the operator seat, showing the alarm canceling switch 18A provided near a display that also serves as the interior alarm 15. Like the horn switch 18, the alarm canceling switch 18A is connected to the controller 30. This connection may be either a wired connection or a wireless connection, and may be either an analog connection or a digital connection. In the case of FIG. 2B, the horn switch 18 does not have to be connected to the controller 30. The controller 30 outputs a control command to the interior alarm 15 in response to a control command from the alarm canceling switch 18A to cancel alarming by the interior alarm 15, for example. The alarm canceling switch 18A may be either a switch exclusive for alarm cancellation or a switch that is normally used for another purpose the same as the horn switch 18. For example, in response to determining that the alarm canceling switch 18A has been operated, the alarm canceling part 32 activates the horn 16 and deactivates the interior alarm 15. When the alarm canceling switch 18A is assigned another function (its original function), the original function may be executed or its execution may be omitted. The alarm canceling part 32 may alternatively activate a surroundings alarm other than the horn 16 and deactivate the interior alarm 15. That is, the activation of the horn 16 may be omitted. In the case of activating a surroundings alarm when canceling an alarm, whether to activate the horn 16 when canceling an alarm may be set as a parameter.

According to the above-described configuration, the alarm canceling part 32 can activate the surroundings alarm simultaneously with the cancellation of alarming by the interior alarm 15. Therefore, when an alarm to the operator of the shovel is canceled, it is possible to more reliably alert workers around, and it is possible to more reliably notify workers around that the shovel starts to move.

Figure 3A:
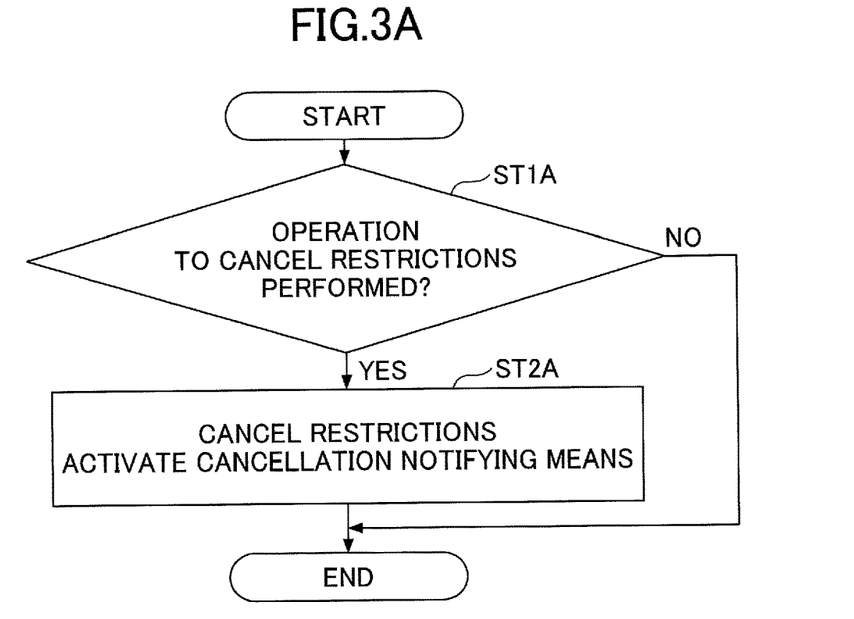
FIG. 3A is a flowchart of an example of a restriction canceling process.

Next, an example of a process of the controller 30 canceling restrictions when the restrictions are in effect because of detection of an object around the shovel (hereinafter "restriction canceling process") is described with reference to FIG. 3A. FIG. 3A is a flowchart of an example of the restriction canceling process. The controller 30 repeatedly executes this restriction canceling process at predetermined control intervals when restrictions are in effect because of detection of an object around the shovel. The restrictions include restricting the motion of the shovel and reporting detection of an object to the operator of the shovel. Examples of reporting detection of an object to the operator of the shovel include continuously sounding an alarm and continuously flashing an LED lamp. Canceling restrictions includes canceling a restriction on the motion of the shovel, stopping an alarm, and turning off an LED lamp.

First, the controller 30 determines whether an operation to cancel restrictions has been performed (step ST1A). Examples of the operation to cancel restrictions include depressing the horn switch 18 and operating the alarm canceling switch 18A.

In response to determining that no canceling operation has been performed (NO at step ST1A), the controller 30 terminates a current restriction canceling process.

In response to determining that a canceling operation has been performed (YES at step ST1A), the controller 30 serving as a canceling part cancels restrictions, and activates a cancellation notifying part to notify the execution of cancellation over the surroundings of the shovel (step ST2A). The cancellation notifying part is a functional element to notify the execution of cancellation by the canceling part over the surroundings using at least one of light, sound, display and vibration.

This configuration makes it possible for the controller 30 to activate the cancellation notifying part simultaneously with the cancellation of restrictions. That is, the operator of the shovel unavoidably activates the cancellation notifying part when canceling restrictions. Therefore, when restrictions are canceled, it is possible to reliably alert workers around, and it is possible to reliably notify workers around that the shovel starts to move.

Figure 3B:
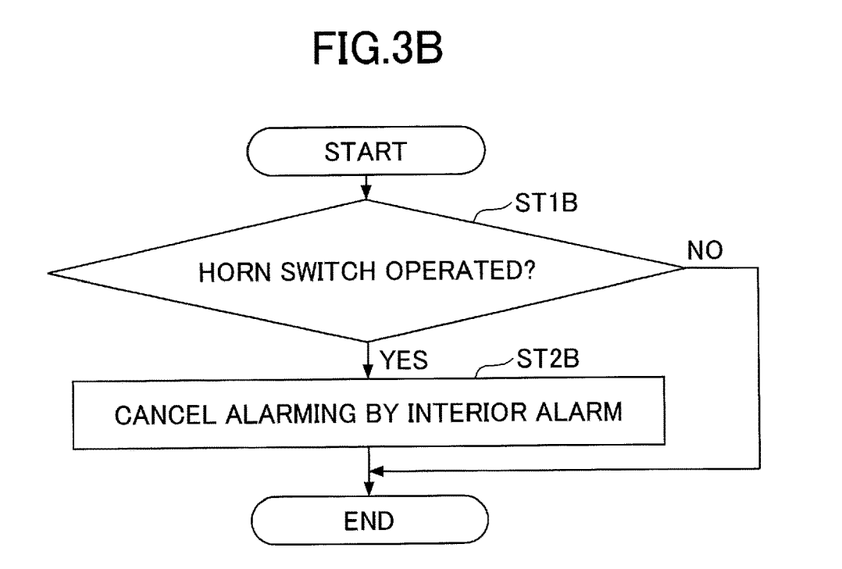
FIG. 3B is a flowchart of an example of an alarm canceling process.

Next, an example of a process of the controller 30 canceling alarming by the interior alarm 15 (hereinafter "alarm canceling process") is described with reference to FIG. 3B. FIG. 3B is a flowchart of an example of the alarm canceling process, which is a specific example of the restriction canceling process. The controller 30 repeatedly executes this alarm canceling process at predetermined control intervals when the interior alarm 15 is activated. In the case of FIG. 3, the object detecting system 50 has detected a person around the shovel and has activated the interior alarm 15.

First, the alarm canceling part 32 of the controller 30 determines whether the horn switch 18 has been operated (step ST1B). For example, the alarm canceling part 32 determines whether the horn switch 18 has been depressed based on a signal that the horn switch 18 outputs to the controller 30.

In response to determining that the horn switch 18 has not been operated (NO at step ST1B), the alarm canceling part 32 terminates a current alarm canceling process.

In response to determining that the horn switch 18 has been operated (YES at step ST1B), the alarm canceling part 32 cancels alarming by the interior alarm 15 (step ST2B). For example, the alarm canceling part 32 deactivates the interior alarm 15 by outputting a control command to the interior alarm 15 in response to a signal from the horn switch 18.

When the horn switch 18 is directly connected to the horn 16, the horn 16 makes an alarm sound in response to depression of the horn switch 18. When the horn switch 18 is indirectly connected to the horn 16 by way of the controller 30, the horn 16 makes an alarm sound in response to a control command from the controller 30.

This configuration makes it possible for the alarm canceling part 32 to activate the horn 16 simultaneously with the cancellation of alarming by the interior alarm 15. That is, the operator of the shovel unavoidably sounds the horn 16 when canceling an alarm. Therefore, when an alarm to the operator of the shovel is canceled, it is possible to reliably alert workers around, and it is possible to reliably notify workers around that the shovel starts to move.

Figure 4A:
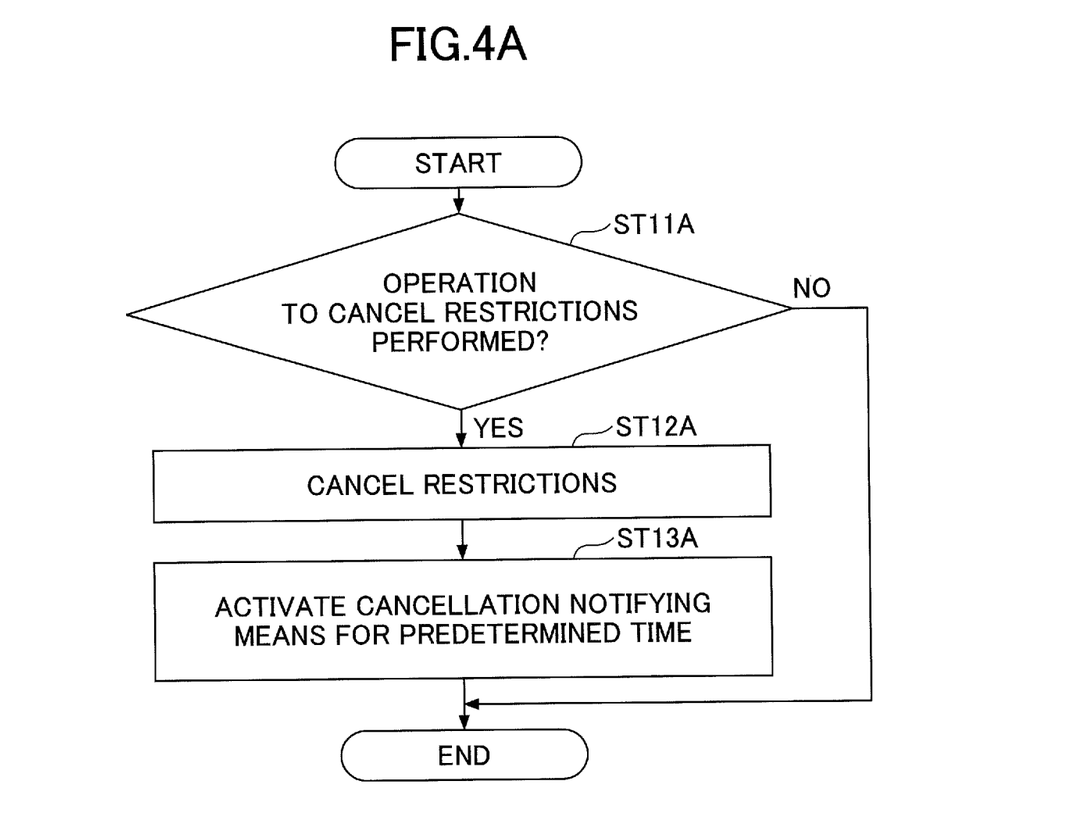
FIG. 4A is a flowchart of another example of the restriction canceling process.

Next, another example of the restriction canceling process is described with reference to FIG. 4A. FIG. 4A is a flowchart of another example of the restriction canceling process. The controller 30 repeatedly executes this restriction canceling process at predetermined control intervals when restrictions are in effect because of detection of an object around the shovel. As described above, the restrictions include restricting the motion of the shovel and reporting detection of an object to the operator of the shovel.

First, the controller 30 determines whether an operation to cancel restrictions has been performed (step ST11A).

In response to determining that no canceling operation has been performed (NO at step ST11A), the controller 30 terminates a current restriction canceling process.

In response to determining that a canceling operation has been performed (YES at step ST11A), the controller 30 cancels restrictions (step ST12A), and activates the cancellation notifying part for a predetermined time (step ST13A).

This configuration makes it possible for the object detecting system 50 to reliably alert a person around the shovel by activing the cancellation notifying part.

Figure 4B:
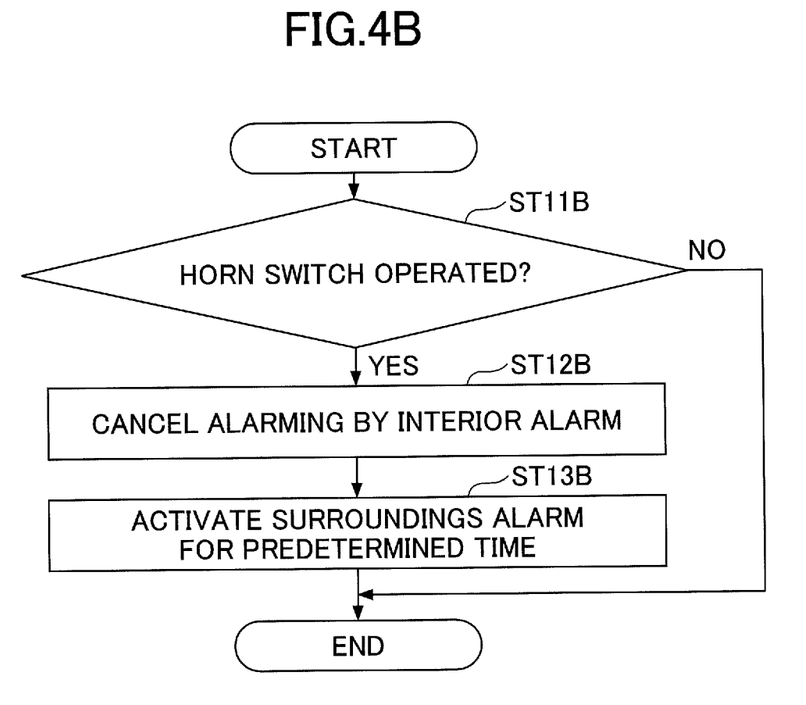
FIG. 4B is a flowchart of another example of the alarm canceling process.

Next, another example of the alarm canceling process is described with reference to FIG. 4B. FIG. 4B is a flowchart of another example of the alarm canceling process. The controller 30 repeatedly executes this alarm canceling process at predetermined control intervals when the interior alarm 15 is activated. In the case of FIG. 4, the object detecting system 50 has detected a person around the shovel and has activated the interior alarm 15.

First, the alarm canceling part 32 of the controller 30 determines whether the horn switch 18 has been operated (step ST11B).

In response to determining that the horn switch 18 has not been operated (NO at step ST11B), the alarm canceling part 32 terminates a current alarm canceling process.

In response to determining that the horn switch 18 has been operated (YES at step ST11B), the alarm canceling part 32 cancels alarming by the interior alarm 15 (step ST12B), and activates the surroundings alarm for a predetermined time (step ST13B). For example, in response to a signal from the horn switch 18, the alarm canceling part 32 deactivates the interior alarm 15 by outputting a control command to the interior alarm 15, and activates the surroundings alarm for a predetermined time by outputting a control command to the surroundings alarm. Examples of the surroundings alarm includes the traveling alarm 21, the work light 22, and the rotating light 23.

When the horn switch 18 is directly connected to the horn 16, the horn 16 makes an alarm sound in response to depression of the horn switch 18. When the horn switch 18 is indirectly connected to the horn 16 by way of the controller 30, the horn 16 makes an alarm sound in response to a control command from the controller 30. In either case, the alarm canceling part 32 can activate the traveling alarm 21 simultaneously with the start of the activation of the horn 16. The duration of activation of the traveling alarm 21 may be equal to the duration of activation of the horn 16, or may be a preset period independent of the duration of activation of the horn 16.

This configuration makes it possible for the object detecting system 50 to alert mainly a person in front of the shovel by sounding the horn 16 and to alert mainly a person to the side or at the back of the shovel by sounding the traveling alarm 21.

Furthermore, the alarm canceling part 32 can activate the work light 22 simultaneously with the start of the activation of the horn 16. In this case, the alarm canceling part 32 may activate all work lights attached to the upper turning body 3 or may activate only a work light that throw light in the direction of a detected person. The activation of the work light 22 includes the flashing (intermittent lighting) of the work light 22. Furthermore, the alarm canceling part 32 can activate the rotating light 23 simultaneously with the start of the activation of the horn 16. The duration of activation of the work light 22 may be equal to the duration of activation of the horn 16, or may be a preset period independent of the duration of activation of the horn 16. The same applies to the rotating light 23.

This configuration makes it possible for the object detecting system 50 to alert mainly a person in front of the shovel by turning on the first front work light 22F1 and the second front work light 22F2 and to alert mainly a person at the back of the shovel by turning on the first back work light 22B1 and the second back work light 22B2. Furthermore, it is possible to alert mainly a person to the left of the shovel by turning on the left work light 22L and to alert mainly a person to the right of the shovel by turning on the right work light 22R. Furthermore, it is possible to alert mainly persons to the side and at the back of the shovel by turning on the rotating light 23.

As described above, the shovel according to the embodiment of the present invention includes a traveling body, a turning body turnably mounted on the traveling body, an object detecting part for detecting a predetermined object around the shovel, a control part for restricting the motion of the shovel or reporting detection of the object when the object is detected, and a canceling part for causing the restricting of the motion or the reporting of the detection to be canceled, where when the canceling part executes cancellation, the execution of the cancellation is notified over the surroundings.

The predetermined object includes a person such as a worker, an animal, and a machine. According to the above-described embodiment, while including the person detecting part 31 that detects a person around the shovel, the shovel may also include an object detecting part that detects a predetermined object other than a person separately from a person. That is, the object detecting part includes the person detecting part 31 and the object detecting part.

The control part is implemented by, for example, the controller 30. The reporting of detection of an object is a report to the operator of the shovel in the cabin 10, and is implemented by, for example, the output of an alarm by the interior alarm 15, the lighting of an LED lamp installed in the cabin 10, or the vibration of the operator seat or the operating lever 17 by a vibrator, or may also be implemented by the output of at least one of sound, display, light and vibration in a portable device such as a cellular phone, a smartphone or a buzzer possessed by the operator of the shovel.

The canceling part is implemented by, for example, the controller 30 (for example, the alarm canceling part 32). The notification of the cancellation by the canceling part is a notification to workers around the shovel, and is implemented by, for example, the activation of the surroundings alarm serving as the cancellation notifying part. The surroundings alarm includes the horn 16, the traveling alarm 21, the work light 22, the rotating light 23, and a display panel attached to the upper turning body 3. The notification of the cancellation by the canceling part may also be implemented by the output of at least one of sound, display, light and vibration in a portable device possessed by a worker, or may also be implemented by the activation of an apparatus such as a loudspeaker, a display panel, or a lighting apparatus installed in a work site. Thus, the cancellation notifying part can notify the execution of cancellation by the canceling part over the surroundings, using at least one of sound, display, light and vibration.

Notifying execution of cancellation over the surroundings means notifying over the surroundings that cancellation has been executed or notifying over the surroundings that cancellation is about to be executed.

When restrictions such as restricting the motion of the shovel or reporting detection of an object to the operator are in effect, canceling the restrictions without any notification to workers around may startle the workers around. This is because, for example, if an operator of the shovel who is not aware of the presence of workers around moves the shovel after the cancellation, the workers around may feel that the shovel has suddenly started to move.

In contrast, the shovel according to the embodiment of the present invention, when the canceling part executes cancellation, notifies the execution of the cancellation over the surroundings, and therefore, can notify workers around that the shovel may start to move, before the shovel starts to move. Therefore, the workers can evacuate, namely, move away from the shovel, before the shovel starts to move, for example. As a result, it is possible to increase the safety of the workers.

The shovel according to the embodiment of the present invention may notify the execution of cancellation by the canceling part over the surroundings simultaneously with the execution of the cancellation. That is, the canceling part may execute cancellation in conjunction with the notification of the cancellation. Alternatively, the canceling part may execute cancellation after the execution of cancellation by the canceling part is notified over the surroundings. That is, the canceling part may be inhibited from executing cancellation before notification of the cancellation by the canceling part, in order to prevent the shovel from being started moving by the cancellation by the canceling part before notification of the cancellation.

The shovel according to the embodiment of the present invention may notify the execution of cancellation by the canceling part over the surroundings, using a part for turning on or blinking a light visible to workers around the shovel. Examples of the part for turning on or blinking a light visible to workers around the shovel may include the work light 22, the rotating light 23, and a display panel that are attached to the upper turning body 3; a display panel and a lighting apparatus installed in a work site; and a portable device possessed by a worker.

The shovel according to the embodiment of the present invention may notify the execution of cancellation by the canceling part over the surroundings, using a sound generating part for generating a sound audible to workers around the shovel. Examples of the sound generating part for generating a sound audible to workers around the shovel include the horn 16, the traveling alarm 21, a loudspeaker, and a buzzer that are attached to the upper turning body 3; a loudspeaker and a buzzer installed in a work site; and a portable device possessed by a worker.

The shovel according to the embodiment of the present invention may include, for example, the cabin 10 serving as a cab, mounted on the upper turning body 3 serving as a turning body; a surroundings alarm attached to the upper turning body 3; the interior alarm 15 installed in the cabin 10; a switch installed in the cabin 10 to cancel alarming by the interior alarm 15; and the controller 30 including the person detecting part 31 serving as a person detecting function to detect a person around the shovel. The controller 30 starts the alarming by the interior alarm 15 in response to detecting a person around the shovel, simultaneously cancels the alarming by the interior alarm 15 and activates the surroundings alarm in response to an operation of the switch, and activates a lighting apparatus attached to the upper turning body 3 for at least a predetermined time when canceling the alarming by the interior alarm 15. Examples of the surroundings alarm include the horn 16, examples of the switch include the horn switch 18, and examples of the lighting apparatus include the work light 22 and the rotating light 23.

The controller 30 may activate the traveling alarm 21 attached to the upper turning body 3 to serve as an audio output device that outputs audio in conjunction with traveling, when canceling the alarming by the interior alarm 15, for example.

The shovel according to the embodiment of the present invention may include a camera that is an example of the object detecting unit 20 attached to the upper turning body 3 and a display serving as a display device installed in the cabin 10. In response to detecting a person around the shovel, the controller 30 may display a camera image captured by the camera and an alarm image indicating the presence of a person around the shovel on the display. The alarm image is composed of, for example, an icon, text, a symbol, etc.

The canceling part (cancellation starting part) is desirably installed in the cab in such a manner as to be manually operable. The canceling part installed manually operably in the cab is, for example, the horn switch 18, and may alternatively be the alarm canceling switch 18A.

The canceling part (cancellation starting part) may be connected to the control part, and the control part may be connected to the cancellation notifying part for notifying, when the canceling part executes cancellation, the execution of the cancellation over the surroundings. The control part may cancel the restricting of the motion of the shovel or the reporting of detection of an object and transmit a signal related to notification to the cancellation notifying part in response to a signal from the canceling part. For example, the alarm canceling switch 18A serving as the canceling part may be connected to the controller 30 serving as the control part. The controller 30 may be connected to the horn 16 serving as the cancellation notifying part for notifying, when the alarm canceling switch 18A executes cancellation, the execution of the cancellation over the surroundings. The controller 30 may cancel the restricting of the motion of the shovel or the reporting of detection of an object and activate the horn 16 by transmitting a notification-related signal to the horn 16 in response to a signal from the alarm canceling switch 18A. This configuration makes it possible for the controller 30 to properly adjust the timing of canceling the restricting of the motion of the shovel or the reporting of detection of an object and the timing of notifying the execution of cancellation over the surroundings. For example, after notifying over the surroundings that cancellation is to be executed, the cancellation may be executed. Alternatively, the cancellation and the notification over the surroundings may be simultaneously executed. As another alternative, immediately after cancellation is executed, the execution of the cancellation may be notified over the surroundings.

Alternatively, the canceling part (cancellation starting part) may be connected to the cancellation notifying part for notifying, when the canceling part executes cancellation, the execution of the cancellation over the surroundings and to the control part. The control part may cancel the restricting of the motion of the shovel or the reporting of detection of an object in response to a signal from the canceling part and the cancellation notifying part may notify the execution of the cancellation over the surroundings in response to a signal from the canceling part. For example, the horn switch 18 serving as the canceling part may be connected to the horn 16 serving as the cancellation notifying part for notifying, when the horn switch 18 executes cancellation, the execution of the cancellation over the surroundings and to the controller 30 serving as the control part. The controller 30 may cancel the restricting of the motion of the shovel or the reporting of detection of an object in response to a signal from the horn switch 18, and the horn 16 may activate and notify the execution of the cancellation over the surroundings in response to a signal from the horn switch 18. This configuration makes it possible for the horn switch 18 to simultaneously effect the activation of the horn 16 and the cancellation of the restricting of the motion of the shovel or the reporting of detection of an object.

Furthermore, the shovel according to the embodiment of the present invention can reliably alert workers around when canceling an alarm to the operator of the shovel, by outputting an alarm through the surroundings alarm when canceling alarming by the interior alarm 15. Furthermore, it is possible to reliably alert workers around even at night by turning on a lighting apparatus when canceling alarming by the interior alarm 15. Moreover, it is possible to reliably notify workers around that the shovel starts to move, by sounding the traveling alarm 21 when canceling alarming by the interior alarm 15. Therefore, the operator of the shovel can reliably alert workers around when canceling an alarm. Furthermore, there is no hassle of performing an operation for alerting workers around separately from an operation for canceling an alarm.

Furthermore, the shovel according to the embodiment of the present invention, in response to detecting a person around the shovel, activates the interior alarm 15 and also displays a camera image and an alarm image indicating the presence of a person around the shovel on a display device installed in the cabin 10. Therefore, it is possible to have the operator of the shovel easily recognize that the activation of the interior alarm 15 is caused as a result of detecting a person. The activation of the interior alarm 15 includes outputting an audio message indicating the detection of a person around the shovel from an in-vehicle loudspeaker.

Furthermore, the shovel according to the embodiment of the present invention detects a person around the shovel using a camera image captured by a camera. Therefore, it is possible to implement a person detecting function without using an object detecting sensor. Furthermore, it is possible to prevent a tree, a building, etc., that are different in shape from a person from being determined as a person. Therefore, it is possible to prevent an alarm from being issued against objects other than a person.

Embodiments of the present invention are described in detail above. The present invention, however, is not limited to the specific embodiments as described above, and allows variations and modifications within the scope of the present invention described in the claims.

For example, when the person detecting part 31 determines that a worker who has been around the shovel is away from the shovel, the alarm canceling part 32 may automatically cancel an alarm activated by the person detecting part 31. Furthermore, when a switch for canceling an alarm is operated with no worker being present around the shovel any more, the activation of the surroundings alarm including the horn 16 may be omitted.

What is claimed is:

1. A construction machine comprising:
    a traveling body;
    a turning body turnably mounted on the traveling body;
    a working attachment attached to the turning body;
    a detector configured to detect a person around the construction machine;
    a hardware processor configured to set the construction machine to a motion restriction state where a motion of the construction machine is restricted, in response to detection of the person by the detector, and
    a surroundings alarm configured to alert the person around the construction machine,
    wherein a cancellation of the motion restriction state of the construction machine activates the surroundings alarm to alert the person around the construction machine.

2. The construction machine as claimed in claim 1, further comprising:
    an operation part configured to be manually operated to activate the surroundings alarm independent of whether the motion of the construction machine is restricted,
    wherein when the operation part is manually operated in the motion restriction state of the construction machine, the surroundings alarm is activated and the motion restriction state is canceled, and when the operation part is manually operated in a state where the motion of the construction machine is not restricted, the surroundings alarm is activated.

3. The construction machine as claimed, in claim 1, further comprising:
    a display configured to display an image of surroundings of the construction machine captured by a camera,
    wherein the hardware processor is configured to, in response to the detection of the person around the construction machine, display the image captured by the camera and an alarm indicating a presence of the person around the construction machine on the display.

4. The construction machine as claimed in claim 3, wherein the hardware processor is configured to cancel the alarm on the display and activate the surroundings alarm, in response to the cancellation of the motion restriction state of the construction machine.

5. The construction machine as claimed in claim 2, wherein the surroundings alarm includes at least one of a horn, a traveling alarm, a work light, and a rotating light.

6. The construction machine as claimed in claim 5, wherein
    the horn is configured to output a sound to surroundings of the construction machine in response to an operation of the operation part, the operation part being a horn switch.

7. The construction machine as claimed in claim 5, wherein
    the traveling alarm is configured to output a sound to surroundings of the construction machine in response to an operation of the operation part, the operation part being a traveling, lever or a traveling pedal.

8. The construction machine as claimed in claim 5, wherein
    the work light is configured to illuminate surroundings of the construction machine in response to an operation of the operation part, the operation part being, a work light switch.

9. The construction machine as claimed in claim 5, wherein
    the rotating light is configured to turn on in response to an operation of the operation part, the operation part being a rotating light switch.

* * * * *